(12) United States Patent
Schulert

(10) Patent No.: US 10,425,789 B2
(45) Date of Patent: *Sep. 24, 2019

(54) PROXIMITY-BASED MEDIA SYSTEM DISCONNECT

(71) Applicant: Sonos, Inc., Santa Barbara, CA (US)

(72) Inventor: Andrew Schulert, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/955,832

(22) Filed: Dec. 1, 2015

(65) Prior Publication Data

US 2016/0095160 A1 Mar. 31, 2016

Related U.S. Application Data

(63) Continuation of application No. 14/041,181, filed on Sep. 30, 2013, now Pat. No. 9,241,355.

(51) Int. Cl.
*H04W 4/60* (2018.01)
*H04L 29/06* (2006.01)
(Continued)

(52) U.S. Cl.
CPC .......... *H04W 4/60* (2018.02); *H04L 65/1026* (2013.01); *H04L 65/4084* (2013.01);
(Continued)

(58) Field of Classification Search
CPC . H04W 76/064; H04W 76/02; H04W 76/028; H04W 4/003; H04W 4/008;
(Continued)

(56) References Cited

U.S. PATENT DOCUMENTS

| | | |
|---|---|---|
| 5,440,644 A | 8/1995 | Farinelli et al. |
| 5,598,278 A | 1/1997 | Tanaka et al. |

(Continued)

FOREIGN PATENT DOCUMENTS

| | | |
|---|---|---|
| CN | 1428048 A | 7/2003 |
| CN | 1551631 A | 12/2004 |

(Continued)

OTHER PUBLICATIONS

International Bureau, International Preliminary Report on Patentability dated Apr. 14, 2016, issued in connection with International Application No. PCT/US2014/056492, filed Sep. 19, 2014, 6 pages.

(Continued)

*Primary Examiner* — Michael Won
(74) *Attorney, Agent, or Firm* — McDonnell Boehnen Hulbert & Berghoff LLP

(57) ABSTRACT

An example implementation involves a media playback system that includes one or more playback devices that are controllable by the mobile device while the mobile device is joined to the media playback system. The mobile device may join the media playback system over one or more communication paths via a cellular network from the mobile device to the media playback system. The example implementation may involve detecting that the mobile device is outside of a threshold proximity to the media playback system while the mobile device is joined to the media playback system. Based on detecting that the mobile device is outside of the threshold proximity to the media playback system, the mobile device may disconnect from the media playback system.

20 Claims, 18 Drawing Sheets

(51) Int. Cl.
*H04N 21/00* (2011.01)
*H04N 21/414* (2011.01)
*H04N 21/436* (2011.01)
*H04N 21/61* (2011.01)
*H04N 21/6587* (2011.01)
*H04W 4/00* (2018.01)
*H04N 21/41* (2011.01)
*H04W 4/80* (2018.01)
*H04W 76/34* (2018.01)
*H04W 4/02* (2018.01)
*H04W 84/12* (2009.01)

(52) U.S. Cl.
CPC ......... *H04N 21/00* (2013.01); *H04N 21/4126* (2013.01); *H04N 21/41407* (2013.01); *H04N 21/43615* (2013.01); *H04N 21/6131* (2013.01); *H04N 21/6181* (2013.01); *H04N 21/6587* (2013.01); *H04W 4/00* (2013.01); *H04W 4/80* (2018.02); *H04W 76/34* (2018.02); *H04W 4/02* (2013.01); *H04W 84/12* (2013.01)

(58) Field of Classification Search
CPC ......... H04N 21/4126; H04N 21/43615; H04N 21/6131; H04N 21/6181; H04N 21/6587; H04N 21/00; H04N 21/41407; H04L 65/4084; H04L 65/1026
USPC ................ 709/203, 217, 219, 222, 231, 237
See application file for complete search history.

(56) References Cited

U.S. PATENT DOCUMENTS

| | | | |
|---|---|---|---|
| 5,636,345 A | 6/1997 | Valdevit | |
| 5,732,275 A | 3/1998 | Kullick et al. | |
| 5,761,320 A | 6/1998 | Farinelli et al. | |
| 5,764,992 A | 6/1998 | Kullick et al. | |
| 5,923,902 A | 7/1999 | Inagaki | |
| 6,032,202 A | 2/2000 | Lea et al. | |
| 6,255,961 B1 | 7/2001 | Van et al. | |
| 6,256,554 B1 | 7/2001 | Dilorenzo | |
| 6,349,352 B1 | 2/2002 | Lea | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,640,284 B1 | 10/2003 | Shaw et al. | |
| 6,728,531 B1 | 4/2004 | Lee et al. | |
| 6,757,517 B2 | 6/2004 | Chang | |
| 6,778,869 B2 | 8/2004 | Champion | |
| 6,922,721 B1 | 7/2005 | Minborg et al. | |
| 7,020,048 B2 | 3/2006 | McComas | |
| 7,079,020 B2* | 7/2006 | Stilp | G06K 7/0008 340/506 |
| 7,130,608 B2 | 10/2006 | Hollstrom et al. | |
| 7,130,616 B2 | 10/2006 | Janik | |
| 7,143,939 B2 | 12/2006 | Henzerling | |
| 7,218,930 B2 | 5/2007 | Ko et al. | |
| 7,236,739 B2 | 6/2007 | Chang | |
| 7,236,773 B2 | 6/2007 | Thomas | |
| 7,251,533 B2 | 7/2007 | Yoon et al. | |
| 7,263,070 B1 | 8/2007 | Delker et al. | |
| 7,295,548 B2 | 11/2007 | Blank et al. | |
| 7,356,011 B1 | 4/2008 | Waters et al. | |
| 7,383,036 B2 | 6/2008 | Kang et al. | |
| 7,394,480 B2 | 7/2008 | Song | |
| 7,433,324 B2 | 10/2008 | Switzer et al. | |
| 7,469,139 B2 | 12/2008 | Van | |
| 7,483,538 B2 | 1/2009 | McCarty et al. | |
| 7,541,940 B2 | 6/2009 | Upton et al. | |
| 7,571,014 B1 | 8/2009 | Lambourne et al. | |
| 7,607,091 B2 | 10/2009 | Song et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,788,395 B2 | 8/2010 | Bowra et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,208,850 B2 | 6/2012 | Jung et al. | |
| 8,234,395 B2 | 7/2012 | Millington et al. | |
| 8,249,071 B2 | 8/2012 | Kreifeldt et al. | |
| 8,280,076 B2 | 10/2012 | Devantier et al. | |
| 8,326,951 B1 | 12/2012 | Millington et al. | |
| 8,483,853 B1 | 7/2013 | Lambourne | |
| 8,544,046 B2 | 9/2013 | Gran et al. | |
| 8,635,335 B2* | 1/2014 | Raleigh | H04W 36/245 709/224 |
| 8,767,630 B1* | 7/2014 | Collins | H04L 43/00 370/328 |
| 8,831,761 B2 | 9/2014 | Kemp et al. | |
| 8,949,922 B2 | 2/2015 | Perlman et al. | |
| 9,210,625 B1* | 12/2015 | Lovlekar | H04W 36/0066 |
| 9,253,803 B2* | 2/2016 | Fyke | H04W 12/06 |
| 9,282,495 B1* | 3/2016 | McKeeman | H04W 36/32 |
| 9,760,174 B1* | 9/2017 | Letendre | G06F 3/016 |
| 9,793,962 B2* | 10/2017 | Smith | H04B 5/0031 |
| 2001/0042107 A1 | 11/2001 | Palm | |
| 2002/0002039 A1 | 1/2002 | Qureshey et al. | |
| 2002/0022453 A1 | 2/2002 | Balog et al. | |
| 2002/0026442 A1 | 2/2002 | Lipscomb et al. | |
| 2002/0062357 A1 | 5/2002 | Srinivasan | |
| 2002/0124097 A1 | 9/2002 | Isely et al. | |
| 2002/0142815 A1 | 10/2002 | Candelore | |
| 2003/0025689 A1 | 2/2003 | Kim | |
| 2003/0083925 A1 | 5/2003 | Weaver et al. | |
| 2003/0112789 A1* | 6/2003 | Heinonen | H04W 28/16 370/349 |
| 2003/0119527 A1* | 6/2003 | Labun | H04L 12/5692 455/456.1 |
| 2003/0135381 A1 | 7/2003 | Mathiesen et al. | |
| 2003/0157951 A1 | 8/2003 | Hasty | |
| 2004/0024478 A1 | 2/2004 | Hans et al. | |
| 2004/0025185 A1 | 2/2004 | Goci et al. | |
| 2004/0078383 A1 | 4/2004 | Mercer et al. | |
| 2004/0078812 A1 | 4/2004 | Calvert | |
| 2004/0117631 A1 | 6/2004 | Colvin | |
| 2004/0117644 A1 | 6/2004 | Colvin | |
| 2004/0117663 A1 | 6/2004 | Colvin | |
| 2004/0117664 A1 | 6/2004 | Colvin | |
| 2004/0128310 A1 | 7/2004 | Zmudzinski et al. | |
| 2004/0168081 A1 | 8/2004 | Ladas et al. | |
| 2004/0181818 A1 | 9/2004 | Heyner et al. | |
| 2004/0225894 A1 | 11/2004 | Colvin | |
| 2004/0261040 A1 | 12/2004 | Radcliffe et al. | |
| 2005/0015760 A1 | 1/2005 | Ivanov et al. | |
| 2005/0086328 A1 | 4/2005 | Landram et al. | |
| 2005/0130585 A1 | 6/2005 | Gnuschke et al. | |
| 2005/0170781 A1 | 8/2005 | Jacobsen et al. | |
| 2005/0190747 A1 | 9/2005 | Sindhwani et al. | |
| 2005/0235338 A1 | 10/2005 | Abiezzi et al. | |
| 2005/0239445 A1 | 10/2005 | Karaoguz et al. | |
| 2006/0041887 A1 | 2/2006 | Dusio | |
| 2006/0059434 A1 | 3/2006 | Boss et al. | |
| 2006/0107295 A1 | 5/2006 | Margis et al. | |
| 2006/0142034 A1 | 6/2006 | Wentink et al. | |
| 2006/0168340 A1 | 7/2006 | Heller et al. | |
| 2006/0173976 A1 | 8/2006 | Vincent et al. | |
| 2006/0173985 A1 | 8/2006 | Moore | |
| 2006/0229102 A1 | 10/2006 | Kitazoe et al. | |
| 2007/0022207 A1 | 1/2007 | Millington et al. | |
| 2007/0028120 A1 | 2/2007 | Wysocki et al. | |
| 2007/0093243 A1 | 4/2007 | Kapadekar et al. | |
| 2007/0100514 A1* | 5/2007 | Park | B60R 25/00 701/2 |
| 2007/0142944 A1 | 6/2007 | Goldberg et al. | |
| 2007/0299778 A1 | 12/2007 | Haveson et al. | |
| 2008/0025535 A1 | 1/2008 | Rajapakse | |
| 2008/0320543 A1 | 12/2008 | Wang et al. | |
| 2009/0007176 A1 | 1/2009 | Casey et al. | |

(56) References Cited

U.S. PATENT DOCUMENTS

| | | |
|---|---|---|
| 2009/0094540 A1 | 4/2009 | Gray et al. |
| 2009/0125971 A1 | 5/2009 | Belz et al. |
| 2009/0274104 A1 | 11/2009 | Addy |
| 2010/0095332 A1 | 4/2010 | Gran et al. |
| 2010/0131848 A1 | 5/2010 | Friedlander et al. |
| 2010/0210317 A1* | 8/2010 | Kakehi ............... H04M 1/6091 455/569.2 |
| 2010/0277300 A1* | 11/2010 | Cohn ..................... G08B 29/02 340/506 |
| 2010/0293598 A1 | 11/2010 | Collart et al. |
| 2011/0138018 A1 | 6/2011 | Raveendran et al. |
| 2011/0216914 A1 | 9/2011 | McCarty et al. |
| 2011/0222523 A1* | 9/2011 | Fu ......................... H04W 36/22 370/338 |
| 2011/0298596 A1 | 12/2011 | Warrick |
| 2012/0062796 A1 | 3/2012 | Roberts et al. |
| 2012/0188052 A1 | 7/2012 | Rosenblatt et al. |
| 2012/0289147 A1 | 11/2012 | Raleigh et al. |
| 2013/0014232 A1 | 1/2013 | Louboutin et al. |
| 2013/0097644 A1 | 4/2013 | Brande et al. |
| 2013/0111347 A1 | 5/2013 | Reilly et al. |
| 2013/0152139 A1 | 6/2013 | Davis et al. |
| 2013/0254663 A1 | 9/2013 | Bates et al. |
| 2013/0308470 A1* | 11/2013 | Bevan .................. H04W 64/00 370/252 |
| 2013/0318560 A1 | 11/2013 | Cholas et al. |
| 2013/0329140 A1 | 12/2013 | Silverberg et al. |
| 2013/0346859 A1 | 12/2013 | Bates et al. |
| 2013/0347022 A1 | 12/2013 | Bates et al. |
| 2014/0006587 A1 | 1/2014 | Kusano |
| 2014/0092828 A1* | 4/2014 | Sirotkin ................. H04W 4/70 370/329 |
| 2014/0098247 A1 | 4/2014 | Rao et al. |
| 2014/0098671 A1 | 4/2014 | Raleigh et al. |
| 2014/0130082 A1 | 5/2014 | Hoshall |
| 2014/0219402 A1* | 8/2014 | Yu ......................... H04L 27/364 375/346 |
| 2014/0233755 A1 | 8/2014 | Kim et al. |
| 2014/0250470 A1 | 9/2014 | Warrick |
| 2014/0269624 A1* | 9/2014 | Khay-Ibbat ........... H04W 36/30 370/332 |
| 2014/0304367 A1 | 10/2014 | Fletcher |
| 2014/0328296 A1* | 11/2014 | Chen ..................... H04W 92/02 370/329 |
| 2014/0331942 A1* | 11/2014 | Sarazyn ................ A01K 29/005 119/719 |
| 2014/0335823 A1 | 11/2014 | Heredia et al. |
| 2014/0361902 A1* | 12/2014 | Carlsson .............. G08B 21/023 340/686.6 |
| 2014/0380353 A1 | 12/2014 | Barton et al. |
| 2016/0037332 A1* | 2/2016 | Egeler .................... G08C 17/02 455/420 |
| 2016/0072639 A1* | 3/2016 | Magielse .............. G05B 19/042 700/275 |
| 2017/0167746 A1* | 6/2017 | Harris .................... G05B 15/02 |
| 2017/0318352 A1* | 11/2017 | Penke ................ H04N 21/6125 |
| 2017/0339617 A1* | 11/2017 | Lei ....................... H04B 17/318 |
| 2018/0176841 A1* | 6/2018 | Sankaranarayan ... H04W 36/14 |
| 2018/0234726 A1* | 8/2018 | Allstead, Jr. ...... H04N 21/43615 |

FOREIGN PATENT DOCUMENTS

| | | |
|---|---|---|
| CN | 101222493 A | 7/2008 |
| EP | 1389853 A1 | 2/2004 |
| EP | 1504367 A2 | 2/2005 |
| EP | 2478714 A1 | 7/2012 |
| JP | 2003242115 A | 8/2003 |
| JP | 2004032330 A | 1/2004 |
| JP | 2012022706 A | 2/2012 |
| JP | 2012100286 A | 5/2012 |
| KR | 20110056288 | 5/2011 |
| WO | 2001/53994 A2 | 7/2001 |
| WO | 2003093950 A2 | 11/2003 |
| WO | 2005065148 A2 | 7/2005 |
| WO | 2012/030733 A1 | 3/2012 |

OTHER PUBLICATIONS

"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
European Patent Office, Extended European Search Report dated Jul. 27, 2016, issued in connection with European patent application No. 14849022.0, 9 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity" Core, Version 1.0 A, Jul. 26, 1999, 1068 pages.
Bluetooth. "Specification of the Bluetooth System: Wireless connections made easy" Core, Version 1.0 B, Dec. 1, 1999, 1076 pages.
Dell, Inc. "Dell Digital Audio Receiver: Reference Guide" Jun. 2000, 70 pages.
Dell, Inc. "Start Here" Jun. 2000, 2 pages.
International Searching Authority, International Search Report dated Dec. 22, 2014, issued in connection with International Application No. PCT/US2014/056492, 3 pages.
International Searching Authority, Written Opinion dated Dec. 22, 2014, issued in connection with International Application No. PCT/US2014/056492, filed Sep. 19, 2014, 4 page.
Jo, J. et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Notice of Allowance dated Oct. 23, 2015, issued in connection with U.S. Appl. No. 14/041181, filed Sep. 30, 2013, 5 pages.
Palm, Inc., "Handbook for the Palm VII Handheld," May 2000, 311 pages.
Presentations at WinHEC 2000, May 2000, 138 pages.
PRISMIQ; Inc., "PRISMIQ Media Player User Guide", 2003, 44 pages.
Sonos Digital Music System, User Guide, Version 090101, Sep. 2006.
UPnP; "Universal Plug and Play Device Architecture"; Jun. 8, 2000; version 1.0; Microsoft Corporation; pp. 1-54.
White R., "How Computers Work," Millenium Edition, Que Corporation, 1999.
Anonymous: "Guide: How to use wireless sound on Apple TV—FlatpanelsHD", Feb. 18, 2013, XP055372167, http://www.flatpanelshd.com/focus.php?subaction=showfull&id=1361169458, 5 pages.
European Patent Office, Office Action dated May 19, 2017, issued in connection with European Application No. 148490220, 5 pages.
Japanese Patent Office, Office Action dated Jun. 6, 2017, issued in connection with Japanese Patent Application No. 2016-518739, 7 pages.

(56) References Cited

OTHER PUBLICATIONS

Japanese Patent Office, Translation of Office Action dated Jun. 6, 2017, issued in connection with Japanese Patent Application No. 2016-518739, 5 pages.
Chinese Patent Office, First Office Action dated Aug. 15, 2018, issued in connection with Chinese Application No. 201480053807.X, 20 pages.
European Patent Office, Summons to Attend Oral Proceedings mailed on Dec. 13, 2017, issued in connection with European Patent Application No. 14849022.0, 7 pages.
Chinese Patent Office, Second Office Action dated Mar. 28, 2019, issued in connection with Chinese Application No. 201480053807.X, 9 pages.
European Patent Office, European Extended Search Report dated Jan. 7, 2019, issued in connection with European Application No. 18207996.2, 10 pages.

\* cited by examiner

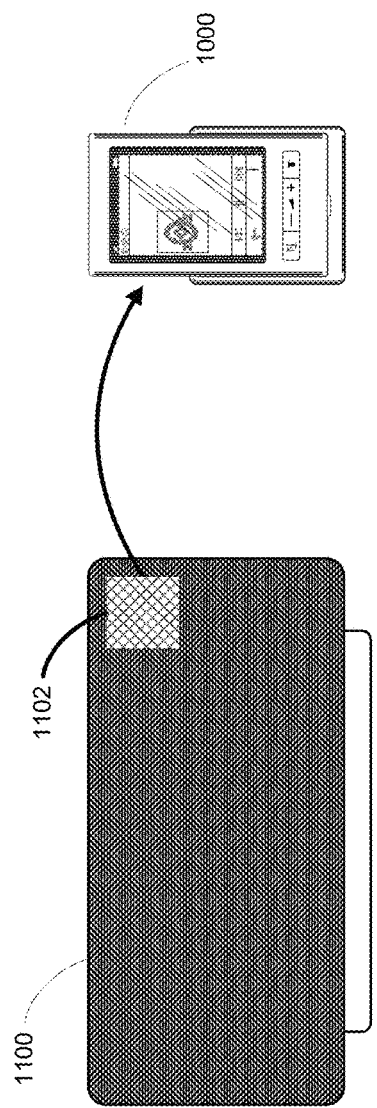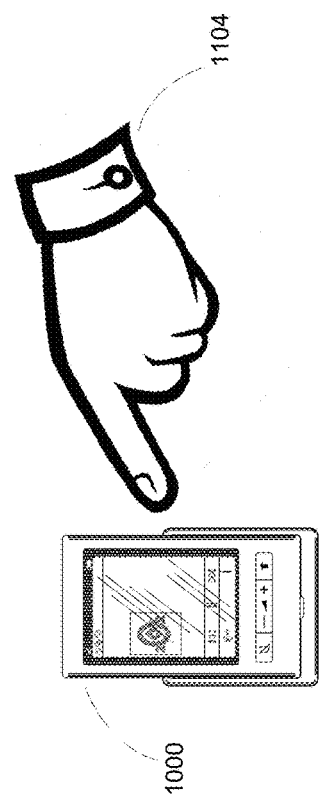
FIGURE 11A
FIGURE 11B

PROXIMITY-BASED MEDIA SYSTEM DISCONNECT

CROSS REFERENCE TO RELATED APPLICATIONS

This application claims priority under 35 U.S.C. § 120 to, and is a continuation of, U.S. non-provisional patent application Ser. No. 14/041,181, filed on Sep. 30, 2013, entitled "Media System Access via Cellular Network," which is incorporated herein by reference.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud across multiple zone players in synchrony. The Sonos system can be controlled by software applications running on network capable mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

FIG. 11A illustrates an example of a mobile device scanning a QR code;

FIG. 11B illustrates an example of a manually entering of a system identifier into a mobile device;

Figure 1:
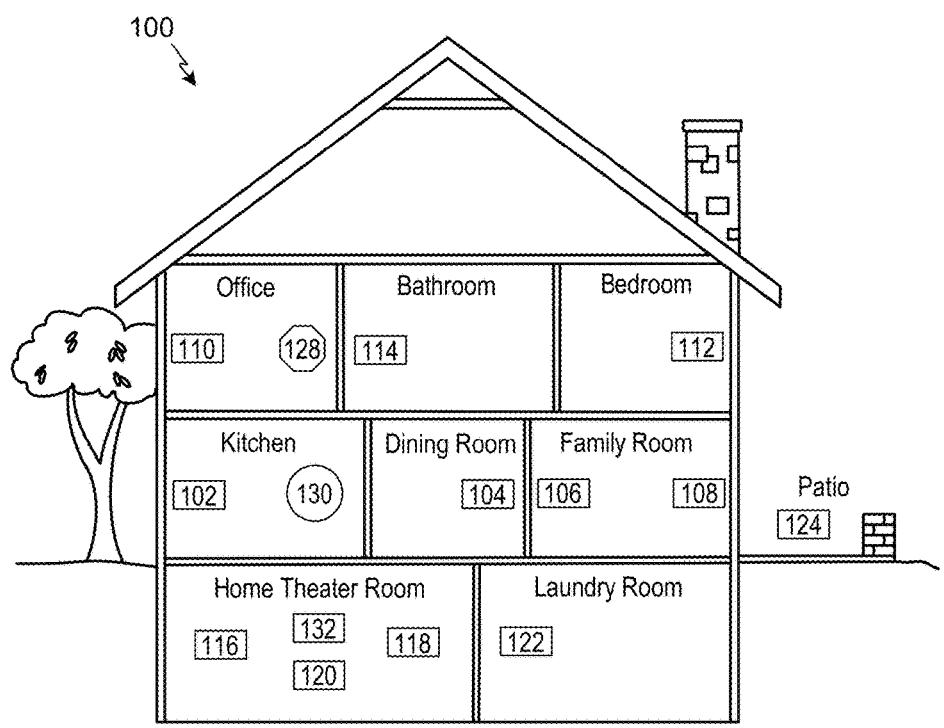
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein involve providing a simple and secure way to allow a user using a mobile device to control a media playback system without having direct access to the secure local network that the media playback system is using. A mobile device may be a mobile phone, a tablet or any other handheld computing device. A media playback system, which may also be referred to as a network media system throughout the application, may include one or more playback devices, possibly organized in groups. Such a configuration may be possible when the media playback system uses a secure local network (e.g. secure LAN). Embodiments of the present application may be provided for an example scenario where access to the secure local network is password protected and the administrator of the secure local network (e.g., the owner of the media playback system) may wish to provide a user of the mobile device with limited control of the media playback system without providing the user with a network password and accordingly without providing general access to other devices connected to the secure local network.

In some embodiments, a user may wish to experience media playback by a media playback system as described above, but may not have access to the secure local network the media playback system uses. This may be, for example, at a friend's house, a restaurant, a coffee house, or a point-of-sale location for media playback system devices. In these cases, the user may be carrying a mobile device with access to a cellular network such as a 3G or 4G network. In one example, the media playback system may have a corresponding Quick Response (QR) code. As such, the user may scan the QR code to obtain a system identifier used to identify the media playback system. The QR code may be located on one or more of the playback devices grouped to form the media playback system. Alternatively, the QR code may be located at other locations such as a sheet of paper provided by the owner of the media playback system. In another example, the user may manually enter a code on the interface of the mobile device, where the code is used to identify the media playback system. In another example, a user may have to use the mobile device to directly browse to a link that will allow for identification of the media playback system. In yet another example, a user may have to send a text with a code to a pre-defined number, and receive in response a link that will allow for identification of the media playback system.

Once the mobile device obtains a system identifier, the mobile device may communicate with a remote server via the cellular network mentioned above. The remote server may be a SONOS® server and may be in communication with the owner's media playback system as well as other media playback systems. The communication between the mobile device and the remote server may involve a request by the mobile device to join the media playback system. The remote server may receive the obtained system identifier along with the request and use the obtained system identifier to identify the corresponding media playback system. Consequently, the remote server may provide configuration information of the media playback system to the mobile device. The mobile device may then use the given information to join the media playback system via the cellular network (possibly continuing to use the server as an intermediate device between the mobile device and the media playback system) and as a result control one or more features of the media playback system. The limited features of the media playback system controlled by the mobile device may be set by default or may be predetermined by the owner of the media playback system.

The control of the media playback system may also be restricted in other aspects. In one case, the mobile device may be configured to disconnect or be disconnected from the media playback system after a predefined time period. In such a case, if the user wishes to re-join the mobile device to the media playback system, the mobile device may send a request to the remote server to re-join the media playback system using the same process described above. In another case, if the user carrying the mobile device leaves the vicinity of the media playback system, it may be determined that the geographical position of the mobile device is no longer within physical proximity of the media playback system. In other words, the media playback system may have a topological range that defines the limited distance away from the playback devices within which the mobile device may control the media playback system. In one example, the topological range may be the range of service provided by the secure local network to which the media playback system is connected. If a mobile device is no longer present within the topological range, the mobile device may be disconnected from the media playback system.

The mobile device may use a control application in order to control the one or more features of the media playback system. The control application may already be present on the mobile device if the mobile device has previously controlled the media playback system or any other playback devices by SONOS®. If the control application is not present on the mobile device, it may be downloaded from the remote server to the mobile device via the cellular network. In one example, the control application may be downloaded in response to the scanning of the QR code. The downloaded control application may be maintained on the mobile device after the mobile device separates from the media playback system. The control application may then be used in the future by the mobile device to control the media playback system or other playback devices sold by SONOS®.

A single user of a mobile device may control the media playback system via the cellular network. However, there may also be multiple users with a mobile device within range to be allowed access to the media playback system. As such, one or more mobile devices may be configured to control the media playback system at a time. While controlling the system, the one or more mobile devices may send one or more audio tracks to a playback queue of the media playback system. The one or more audio tracks may then be stored as a playlist on the remote server. The playlist may then be retrieved by a mobile device at any point in time when a mobile device controls the media playback system.

As indicated above, the present application involves providing a simple and secure way to allow a user using a mobile device to control a media playback system without having direct access to the secure local network that the media playback system is using. In one aspect, a method is provided. The method involves receiving, by a mobile device, a system identifier of a media playback system, wherein the media playback system is in communication with a remote server, and wherein the media playback system comprises one or more playback devices in communication over a secure local network. Responsive to receiving the system identifier, sending, by the mobile device to the remote server via a cellular network, a request to join the media playback system, the request including the system identifier of the media playback system. The method also involves receiving configuration information of the media playback system from the remote server, the configuration information including information to join the media playback system. The method further involves joining the mobile device to the media playback system via a cellular network and responsively sending from the mobile device to the media playback system via a cellular network one or more commands to control the media playback system.

In another aspect, a non-transitory computer readable memory is provided. The non-transitory computer readable memory has stored thereon instructions executable by a computing device to cause the computing device to perform functions. The functions include receiving, by the mobile device, a system identifier of a media playback system, wherein the media playback system is in communication with a remote server, and wherein the media playback system comprises one or more playback devices in communication over a secure local network. Responsive to receiving the system identifier, sending, by the mobile device to the remote server via a cellular network, a request to join the media playback system, the request including the system identifier of the media playback system. The functions also include receiving configuration information of the media playback system from the remote server, the configuration information including information to join the media playback system. The functions further include joining the mobile device to the media playback system via a cellular network and sending from the mobile device to the media playback system via a cellular network one or more commands to control the media playback system.

In yet another aspect, a system is provided. The device includes a media playback system comprising one or more playback devices in communication over a secure local network, a remote server in communication with the media playback system, a cellular network, and a mobile device. The mobile device is configured to receive a system identifier of the media playback system. Responsive to receiving a system identifier, send to the remote server via the cellular network, a request to join the media playback system, the request including the system identifier of the media playback system. The mobile device is also configured to receive configuration information of the media playback system from the remote server, the configuration information including information to join the media playback system. The mobile device is further configured to join the media playback system via the cellular network and send to the media playback system via the cellular network one or more commands to control the media playback system.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, although it should be understood that the home could be configured with only one zone. Additionally, one or more zones can be added to the configuration 100 over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. Zone players 102-124, also referred to herein as playback devices, multimedia units, speakers, players, and so on, provide audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
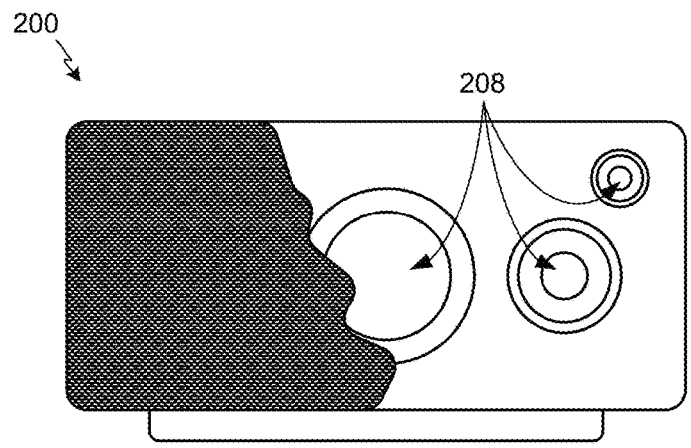
FIG. 2A shows an illustration of an example zone player having a built-in amplifier and transducers.
Figure 2B:
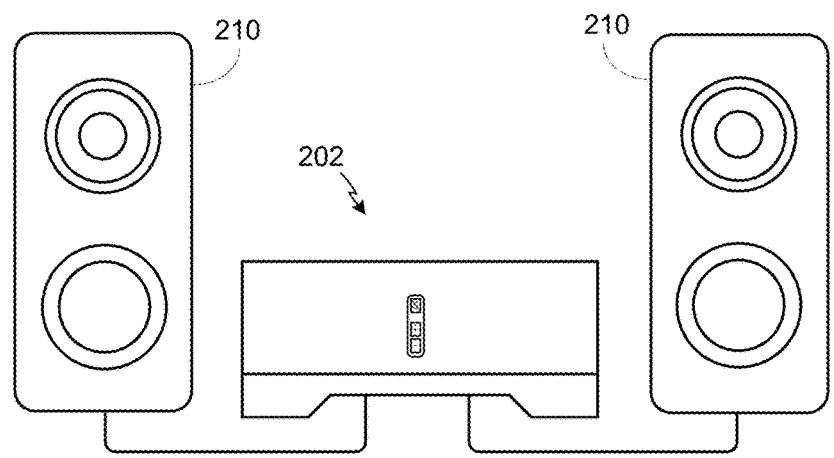
FIG. 2B shows an illustration of an example zone player having a built-in amplifier and connected to external speakers.
Figure 2C:
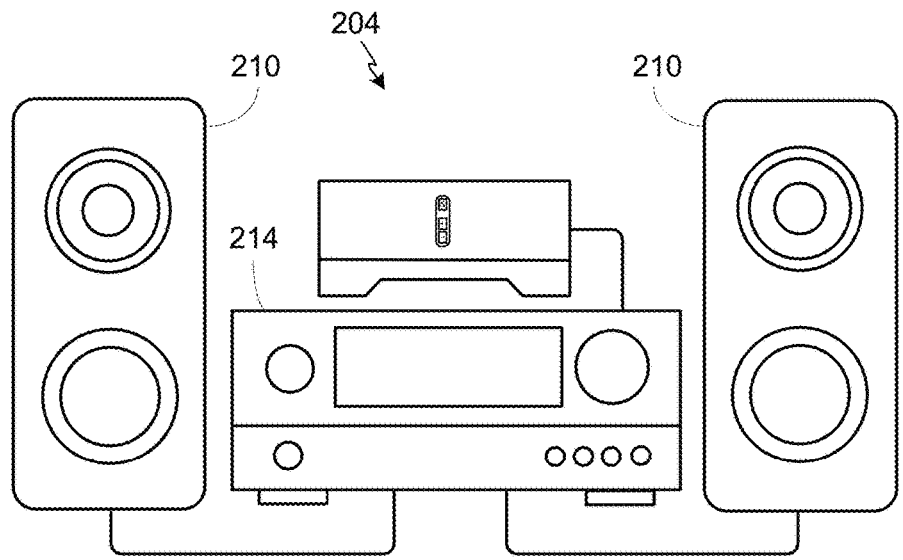
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates a zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the media content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, radio station name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple iPod™ or similar device.

b. Example Controllers

Figure 3:
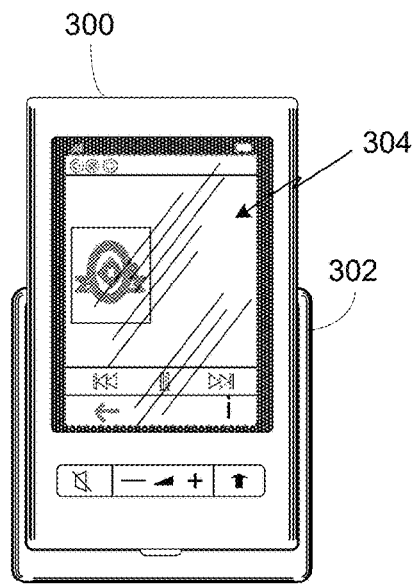
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, modify and/or clear the playback queue of one or more zone players, control other operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for iPhone™," "SONOS® Controller for iPad™," "SONOS® Controller for Android™," "SONOS® Controller for Mac™ or PC."

c. Example Data Connection

Zone players 102-124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, a "bonded zone" contains two or more zone players, such as the two zone players 106 and 108 in the family room, then the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired or consolidated zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for an individual to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as Airplay™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
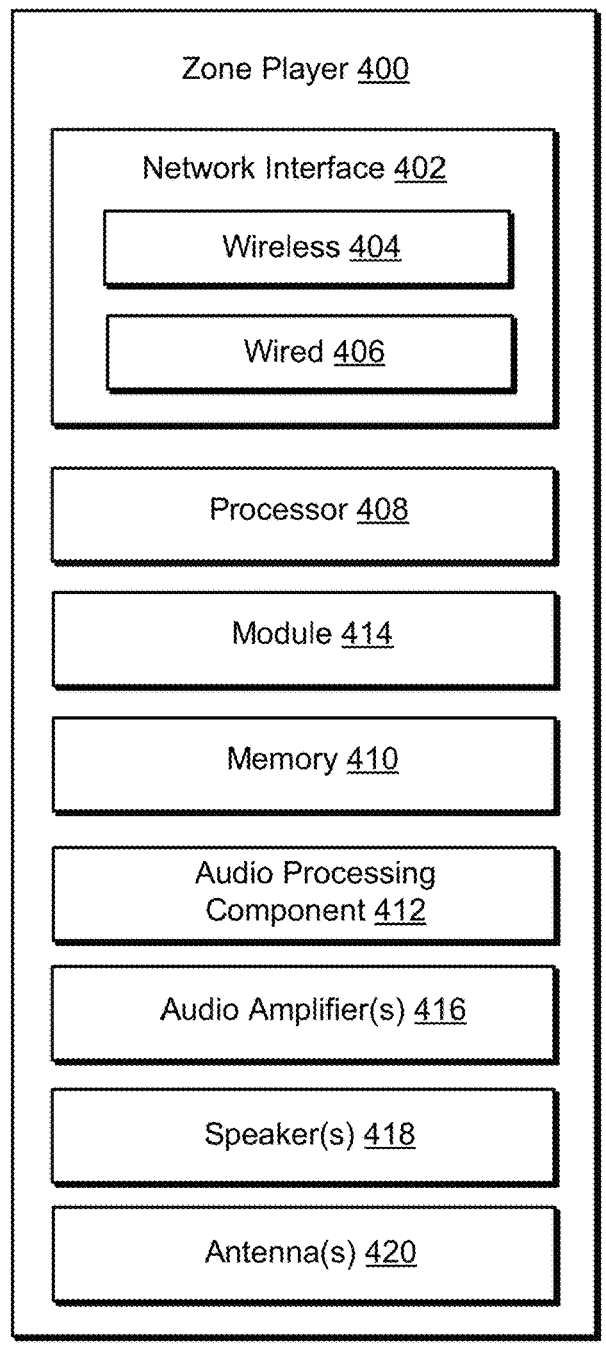
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.11ac, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
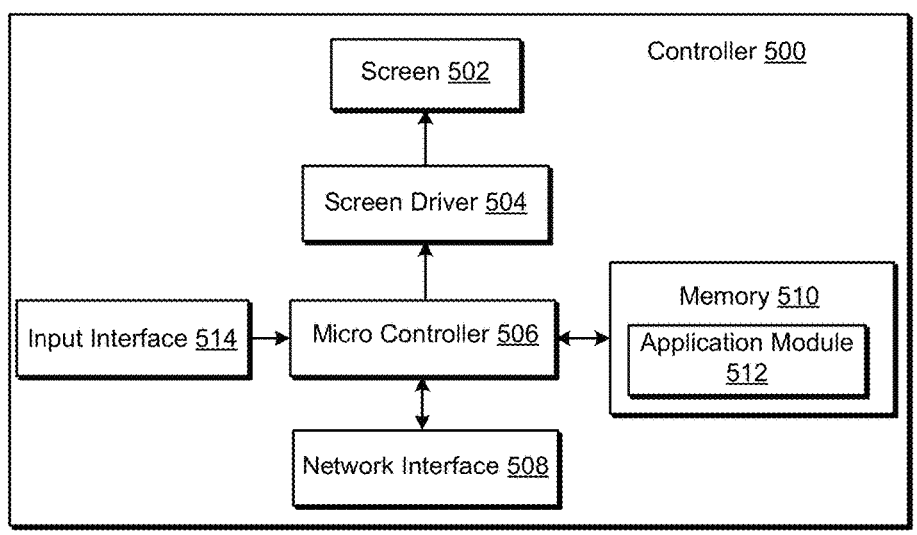
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group to facilitate synchronized playback amongst the zone players in the zone group. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone™, iPad™ or any other smart phone or network-enabled device (e.g., a networked computer such as a PC or Mac™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer. In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a family room+ dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/ rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
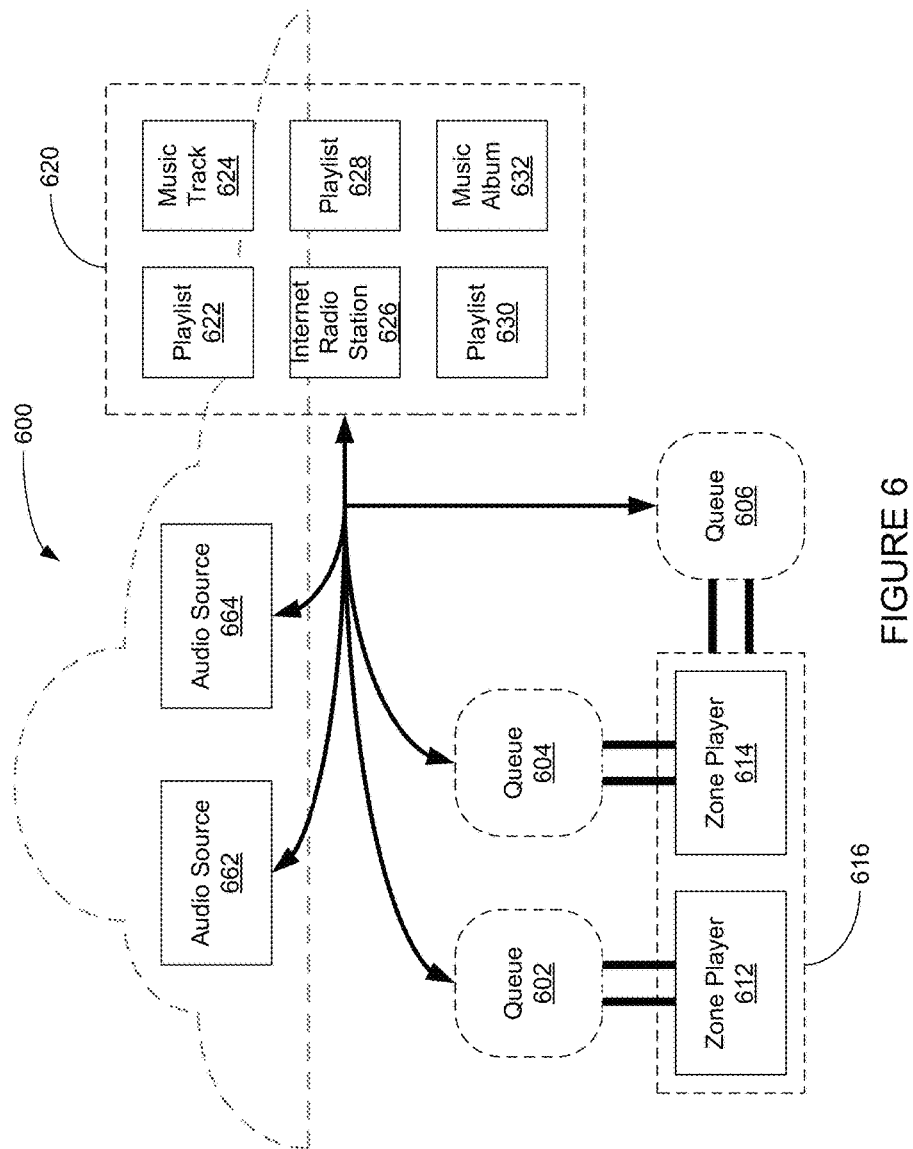
FIG. 6 shows an example playback queue configuration for a network media system.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, favorite Internet radio station 626, playlists 628 and 630, and album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (i.e., URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
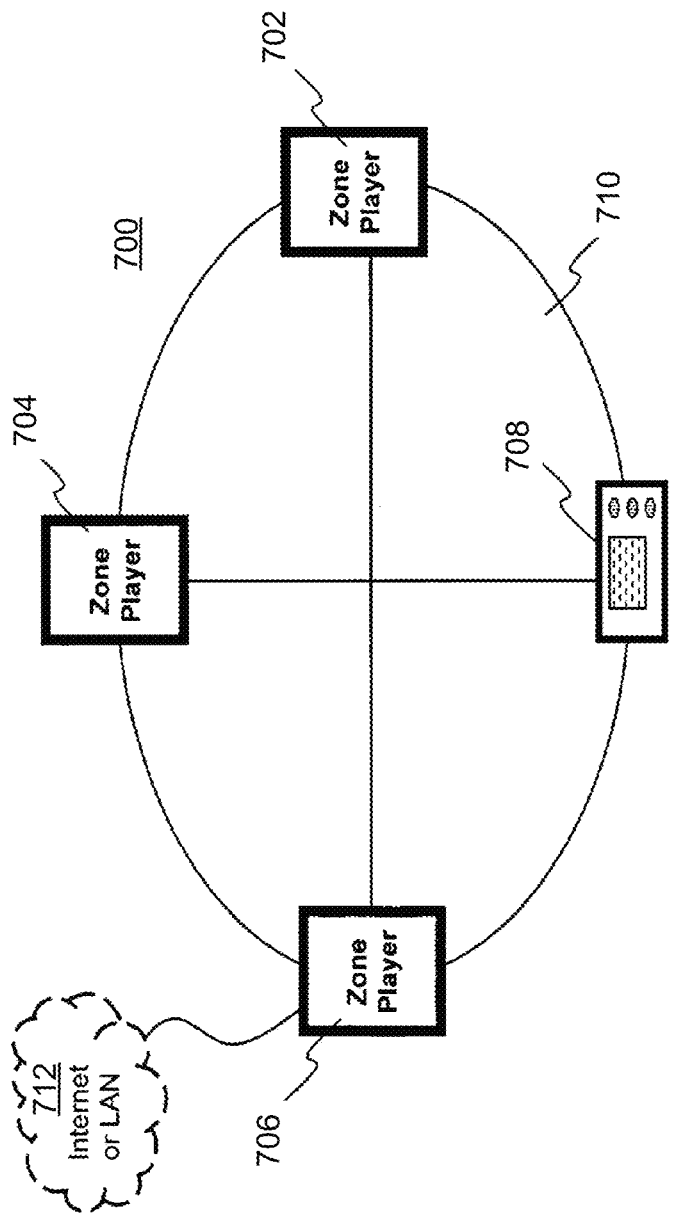
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
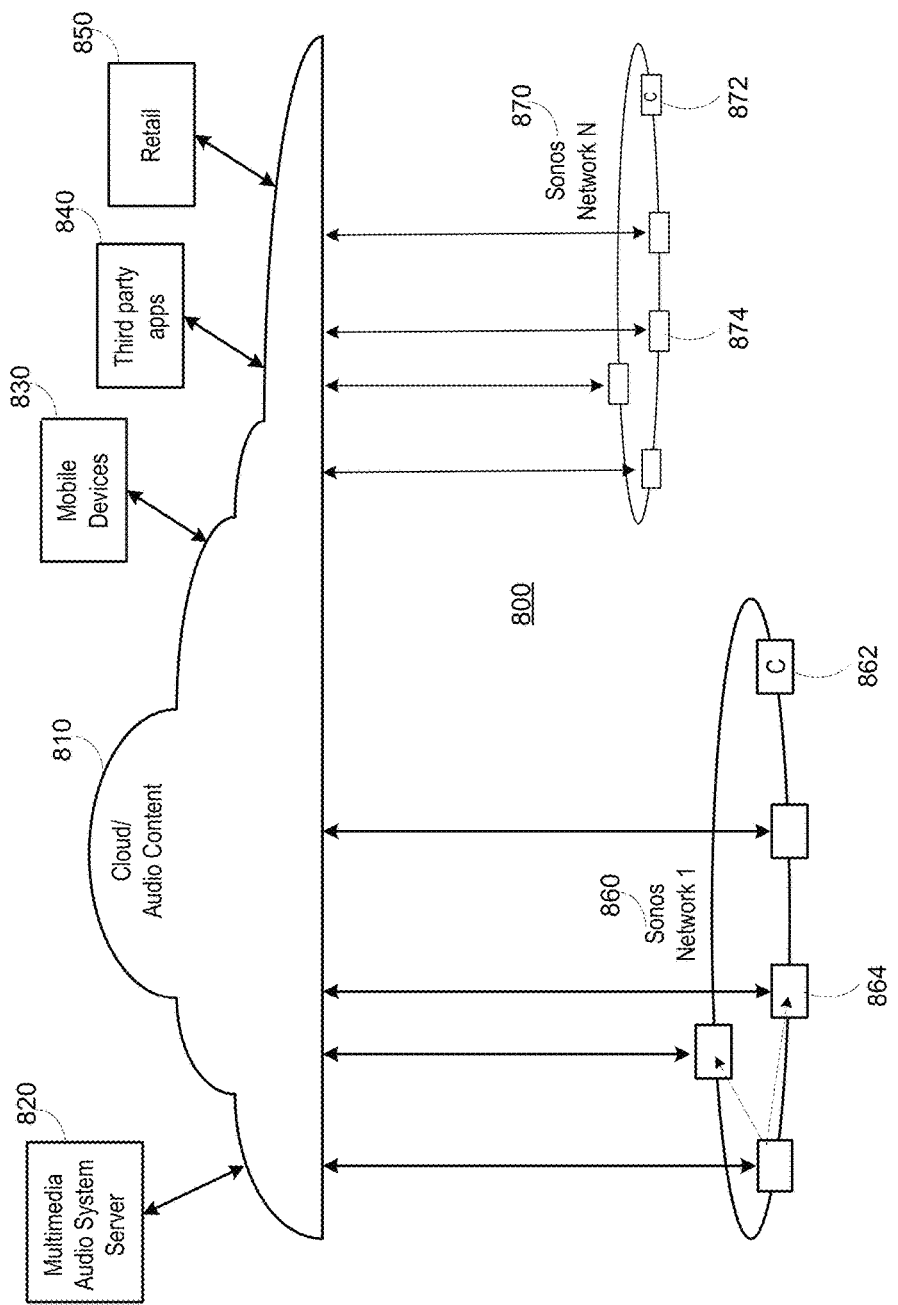
FIG. 8 shows an example system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Example Joining of a Mobile Device to a Media Playback System

As discussed above, embodiments described herein involve providing a simple and secure way to allow a user using a mobile device to control a media playback system without having direct access to the secure local network that the media playback system is using. As indicated, this invention may be useful in a situation where access to the secure local network may be password protected and an owner of the media playback system wants to provide a user of the mobile device with limited control of the media playback system without providing the user with a network password or providing the user access to other devices connected to the secure local network.

Figure 9:
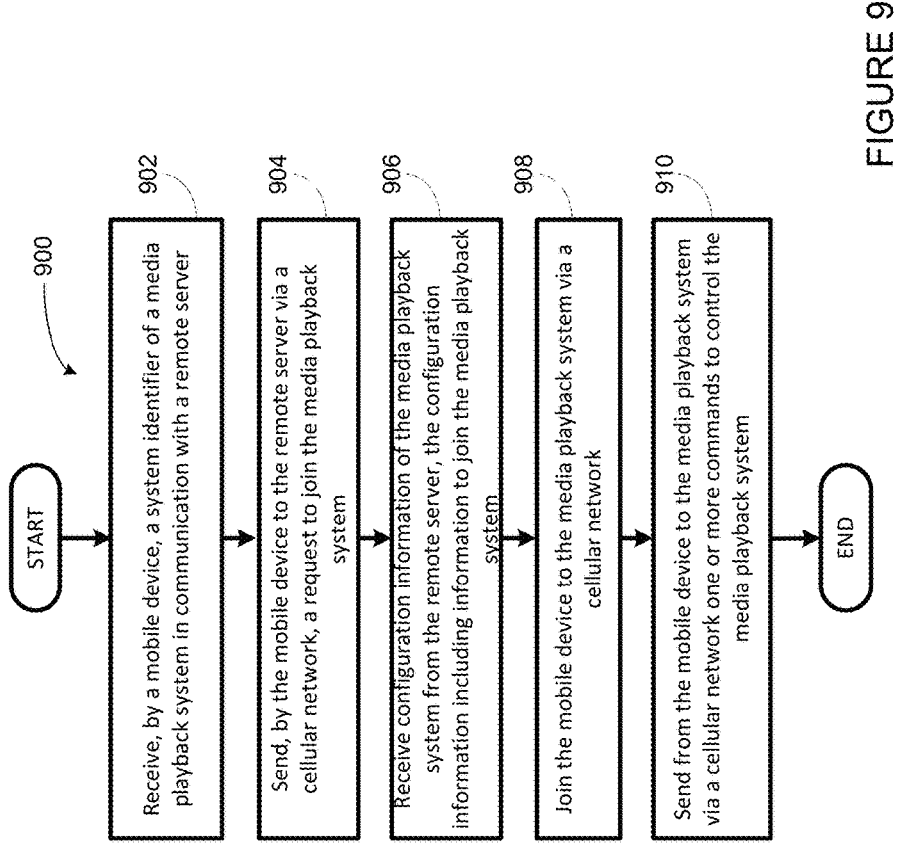
FIG. 9 shows an example flow diagram for joining a mobile device to a media playback system via a cellular network.

FIG. 9 shows an example flow diagram for joining a mobile device to a media playback system, in accordance with at least some embodiments described herein. Method 900 shown in FIG. 9 presents an embodiment of a method that could be used in the environments 100, 600, 700, and 800 with the systems 200, 202, 204, 300, 400, and 500 for example, in communication with one or more devices, such as those illustrated in FIGS. 2-5. Method 900 may include one or more operations, functions, or actions as illustrated by one or more of blocks 902-908. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

At block 902, the method 900 may involve receiving, by a mobile device, a system identifier of a media playback system in communication with a remote server. In one example, the media playback system may include one or more playback devices in communication over a secure local network. For illustration purposes, playback devices discussed hereafter may be a zone player as described above in connection to FIGS. 2A-2C. As such, the playback device may be one of a group of playback devices in a network media system (may also be referred to as a media playback system) as discussed and shown in FIG. 1.

Figure 10:
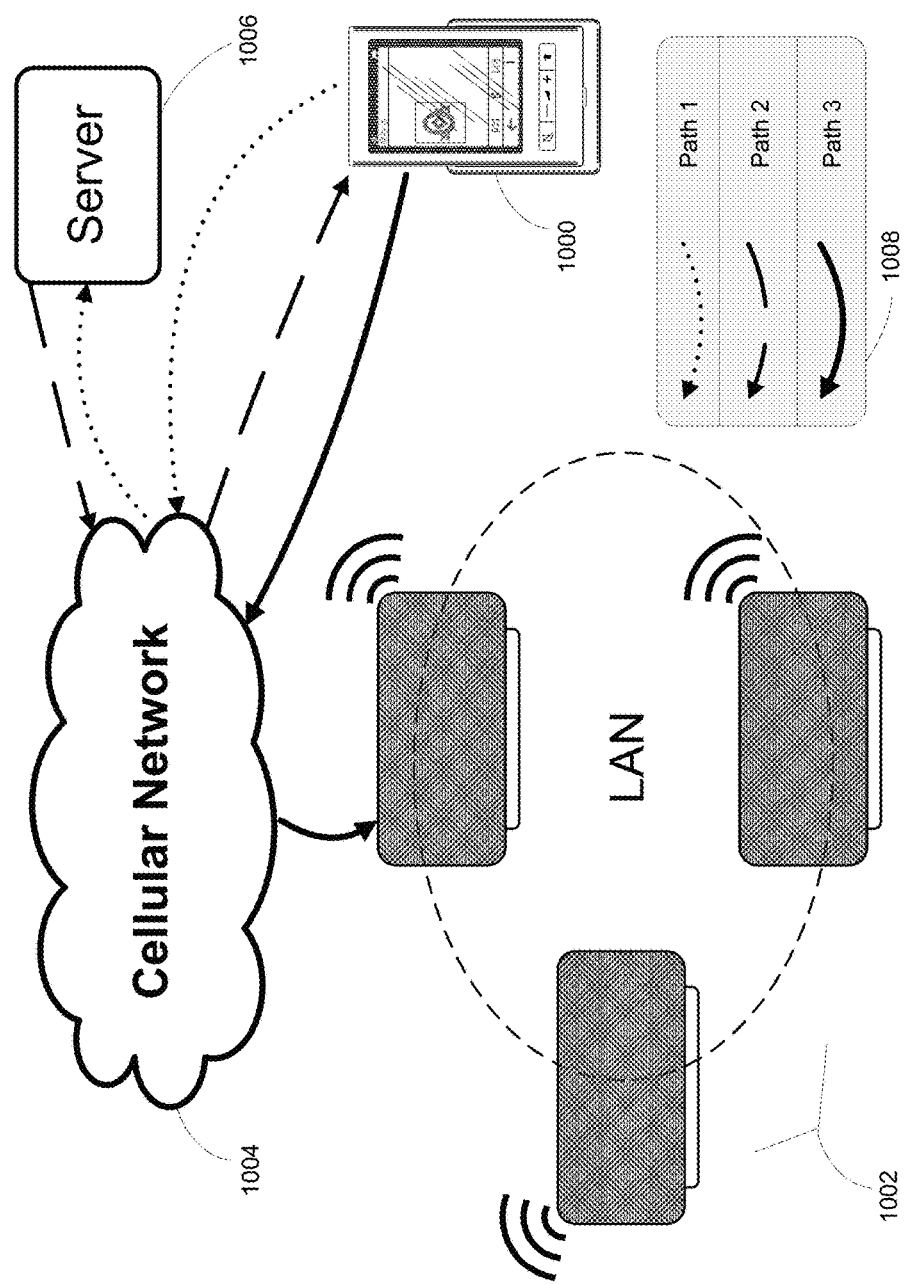
FIG. 10 illustrates an example of a mobile device joining a media playback system via a cellular network by communicating to a server.

FIG. 10 shows a mobile device 1000 that may be a mobile phone, a tablet or any other handheld computing device. Mobile device 1000 may be mobile device 830 as described above in connection to FIG. 8 and/or controller 300 as described above in connection to FIG. 3, which may also correspond to controlling device 130 of FIG. 1. As mentioned above, media playback system 1002 may include one or more playback devices interconnected by a wired, wireless, or both wired and wireless data network. Such a configuration may be possible when the media playback system 1002 uses a secure local network such as a local area network (LAN) shown in FIG. 10. The secure local network may correspond to network 710 as described above in connection to FIG. 7, or networks 860 and 870 as described above in connection with FIG. 8.

Also shown in FIG. 10 is cellular network 1004, which may be a 3G or a 4G network, for example. FIG. 10 additionally shows server 1006, which may correspond to the multimedia audio system server 820 described above in connection to FIG. 8. The legend 1008 of FIG. 10 may be used to help visually distinguish between the various communication paths occurring via the cellular network 1004 shown in FIG. 10. More specifically, legend 1008 shows Path 1 corresponding to the communication path from mobile device 1000 to server 1006 via the cellular network, Path 2 corresponding to the communication path from server 1006 to mobile device 1000, and Path 3 corresponding to the communication path from mobile device 1000 to media playback system 1002.

The mobile device 1000 may have Internet access via cellular network 1004. In order to join mobile device 1000 to media playback system 1002, the mobile device 1000 may be required to obtain a system identifier that is used to identify media playback system 1002. In one example, FIG. 11A shows mobile device 1000 as well as playback device 1100, which may be one of the playback devices in the media playback system 1002. Also shown is Quick Response (QR) code 1102 that may be located on one or more of the playback devices. A user of mobile device 1000 may scan the QR code to obtain the system identifier as shown in FIG. 11A. Alternatively, the QR code may also be located at other locations such as a sheet of paper provided by the owner of the media playback system 1002.

In another example, the system identifier may also be obtained as shown in FIG. 11B. More specifically, user 1104 may manually enter a code on the interface of mobile device 1000, where the code is used to identify the media playback system. The code may be given to user 1104 by the owner of media playback system 1002. In yet another example, user 1104 may have to use the mobile device 1000 to directly browse to a link via cellular network 1004 that will allow for identification of the media playback system 1002.

At block 904, the method 900 may involve sending, by the mobile device to the remote server via a cellular network, a request to join the media playback system. The request may include the system identifier of the media playback system. In other words, once mobile device 1000 obtains a system identifier, the mobile device may communicate to remote server 1006 via Path 1 shown in FIG. 10. The remote server 1006 may be in communication with the owner's media playback system 1002 as well as other media playback systems and playback devices by SONOS®. The communication between the mobile device 1000 and the remote server 1006 may involve a request by the mobile device 1000 to join the media playback system 1002. The remote server 1006 may receive the obtained system identifier along with the request and use it to identify the correct media playback system 1002.

At block 906, the method 900 may involve receiving configuration information of the media playback system from the remote server. The configuration information may include information to join the media playback system. In other words, the remote server 1006 may provide configuration information of the media playback system 1002 to the mobile device 1000 via Path 2. The mobile device 1000 may then use the received configuration information to join the media playback system 1002 via the cellular network 1004 as described at block 908 of FIG. 9.

At block 910, the method may involve sending from the mobile device to the media playback system via a cellular network one or more commands to control the media playback system. In other words, as a result of joining mobile device 1000 to media playback system 1002, mobile device 1000 may control one or more features of the media playback system via Path 3. The limited features of the media playback system 1002 controlled by the mobile device 1000 may be set by default or may be predetermined by the owner of the media playback system 1002.

Figure 12A:
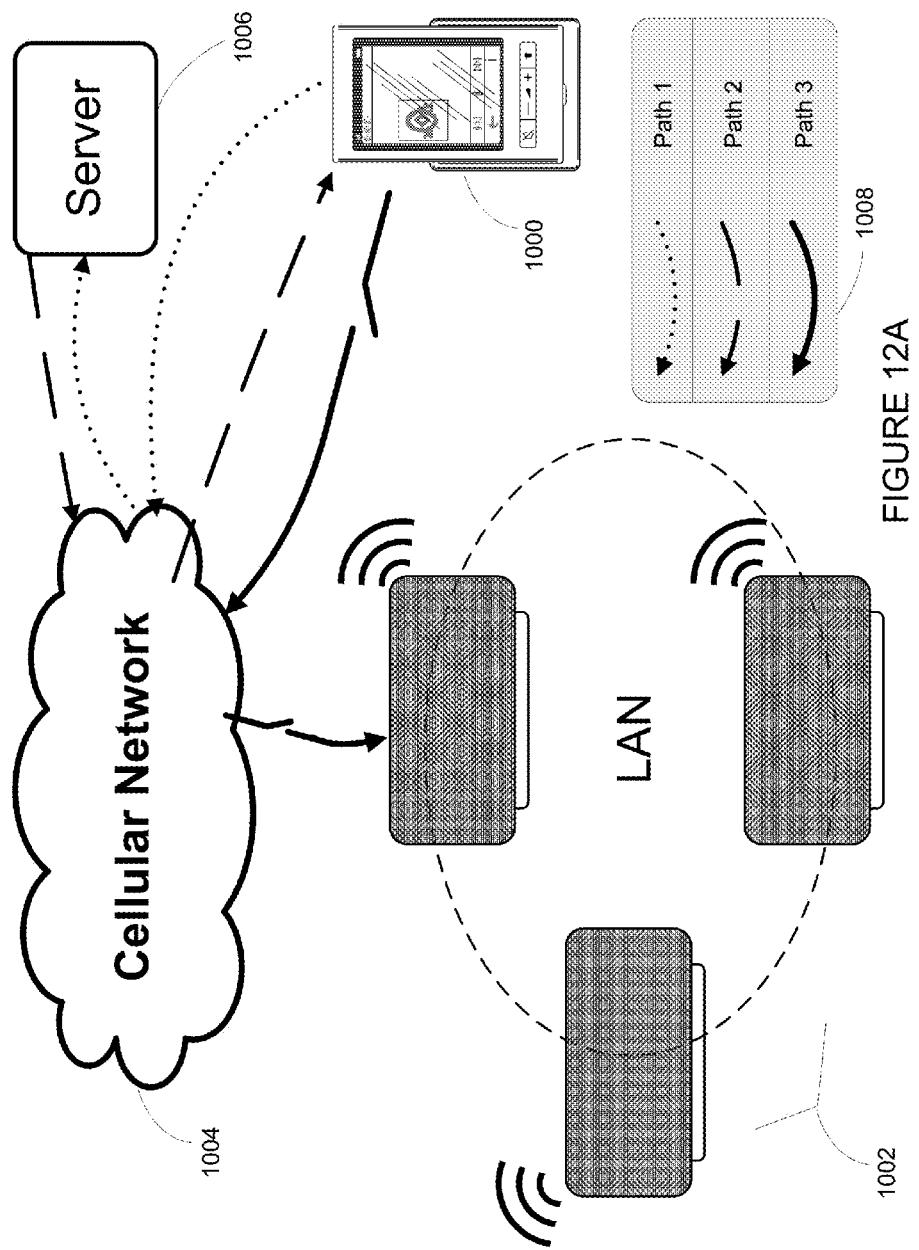
FIG. 12A illustrates an example disconnection of a mobile device from a media playback system after a predefined time period.

The control of the media playback system 1002 may also be limited in other aspects. In one case, as shown in FIG. 12A, the mobile device 1000 may be configured to disconnect from the media playback system after a predefined time period. This disconnection may be shown by "broken" Path 3 in FIG. 12A. The predefined time period may be set by default or may be selected by the owner of media playback system 1002, among other possibilities. If the user of the mobile device 1000 wishes to reconnect to the media playback system 1002, the mobile device 1000 may send a request to the remote server 1006 via Path 1 to re-join the media playback system 1002 using the same process described above in connection to FIG. 10.

Figure 12B:
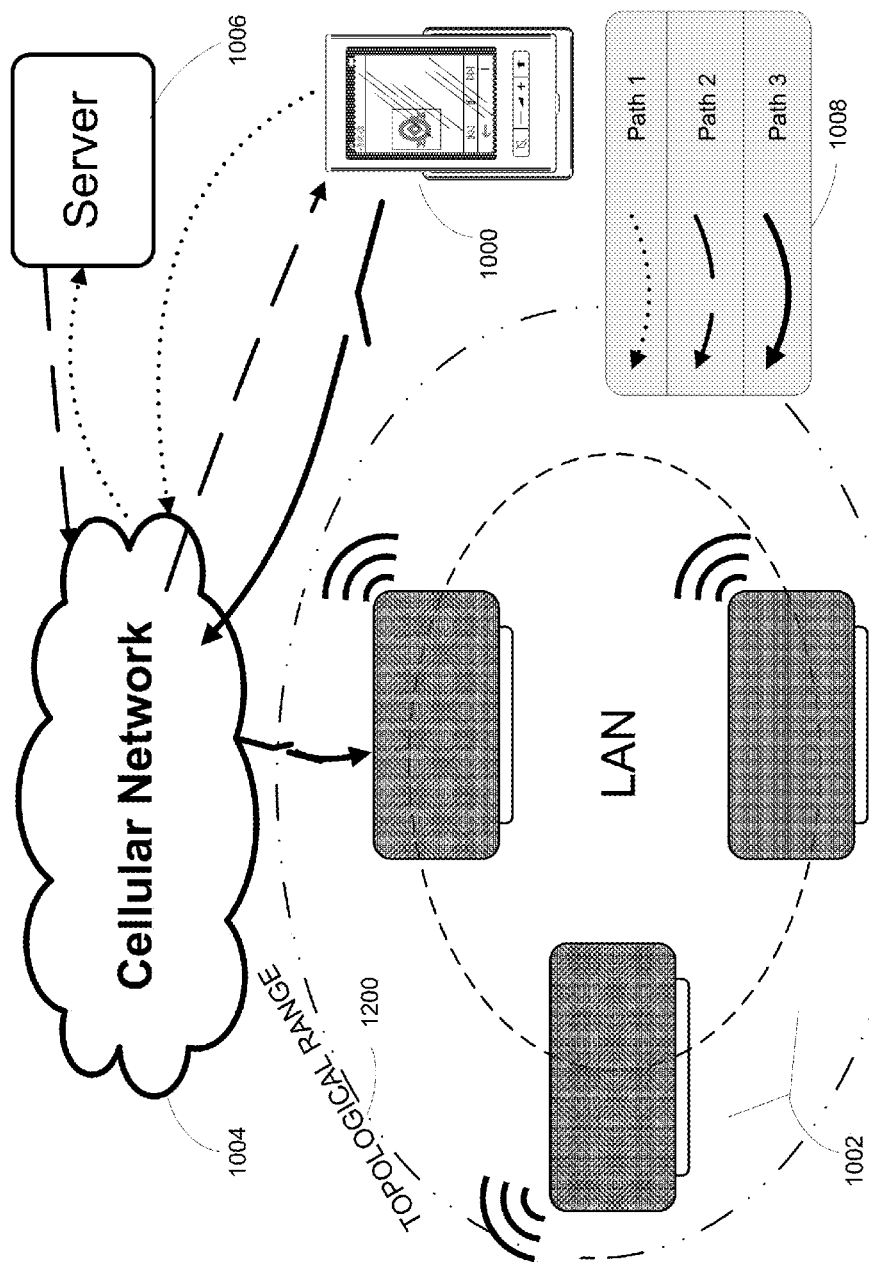
FIG. 12B illustrates an example disconnection of a mobile device from a media playback system when the mobile device is no longer within a physical proximity of the media playback system.

In another case, as shown in FIG. 12B, it may be determined that the geographical position of the mobile device 1000 is no longer within physical proximity of the media playback system 1002. In other words, the media playback system 1002 may have a topological range 1200 that defines the limited distance away from the playback devices in which the mobile device 1000 may access and have control (albeit limited control) of the media playback system 1002. In one example, the topological range 1200 may be the range of service provided by the secure local network (LAN) to which the media playback system 1002 is connected. If a mobile device 1000 is no longer present within the topological range 1200 as shown in FIG. 12B, the mobile device 1000 may be separated from the media playback system 1002. This separation is also shown by "broken" Path 3 in FIG. 12B.

Figure 13A:
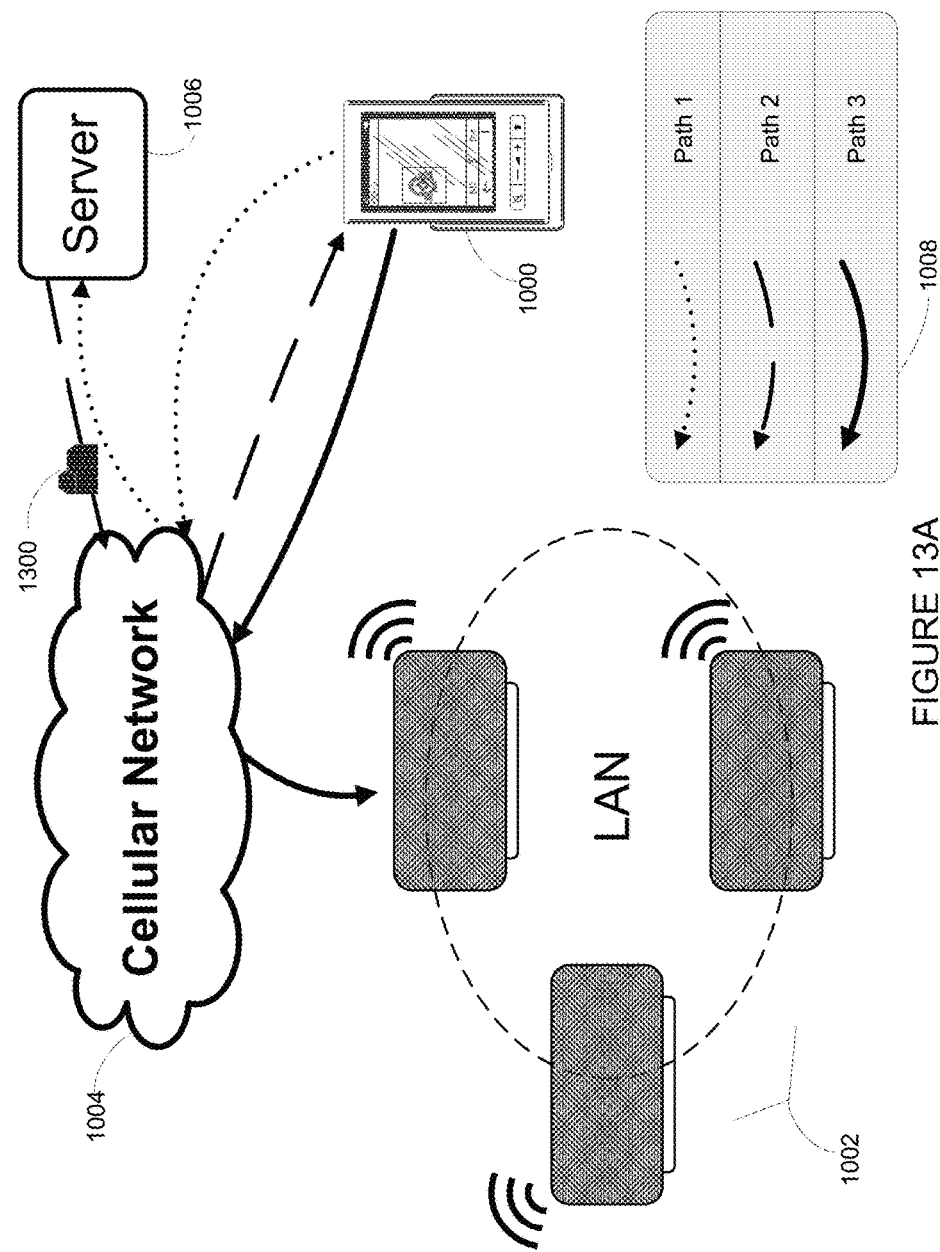
FIG. 13A illustrates an example of a downloading of a control application to a mobile device.

FIG. 13A shows the downloading of control application 1300 from the remote server 1006 to mobile device 1000 via Path 2. Control application 1300 may be the application described above in association with FIG. 3. Additionally, Control application 1300 may be used in association with a third party application 840 such as Spotify, Pandora, or Rhapsody among other possibilities as described above in association with FIG. 8. The mobile device 1000 may use the control application 1300 in order to control the one or more features of the media playback system 1002. The control application 1300 may already be present on the mobile device 1000 if the mobile device 1000 has previously controlled the media playback system 1002 or any other playback devices by SONOS®. If the control application 1300 is not present on the mobile device 1000, the control application may be downloaded from the remote server 1006 to the mobile device 1000 via Path 2. In some cases, the control application may be downloaded in response to the scanning of the QR code discussed above.

Figure 13B:
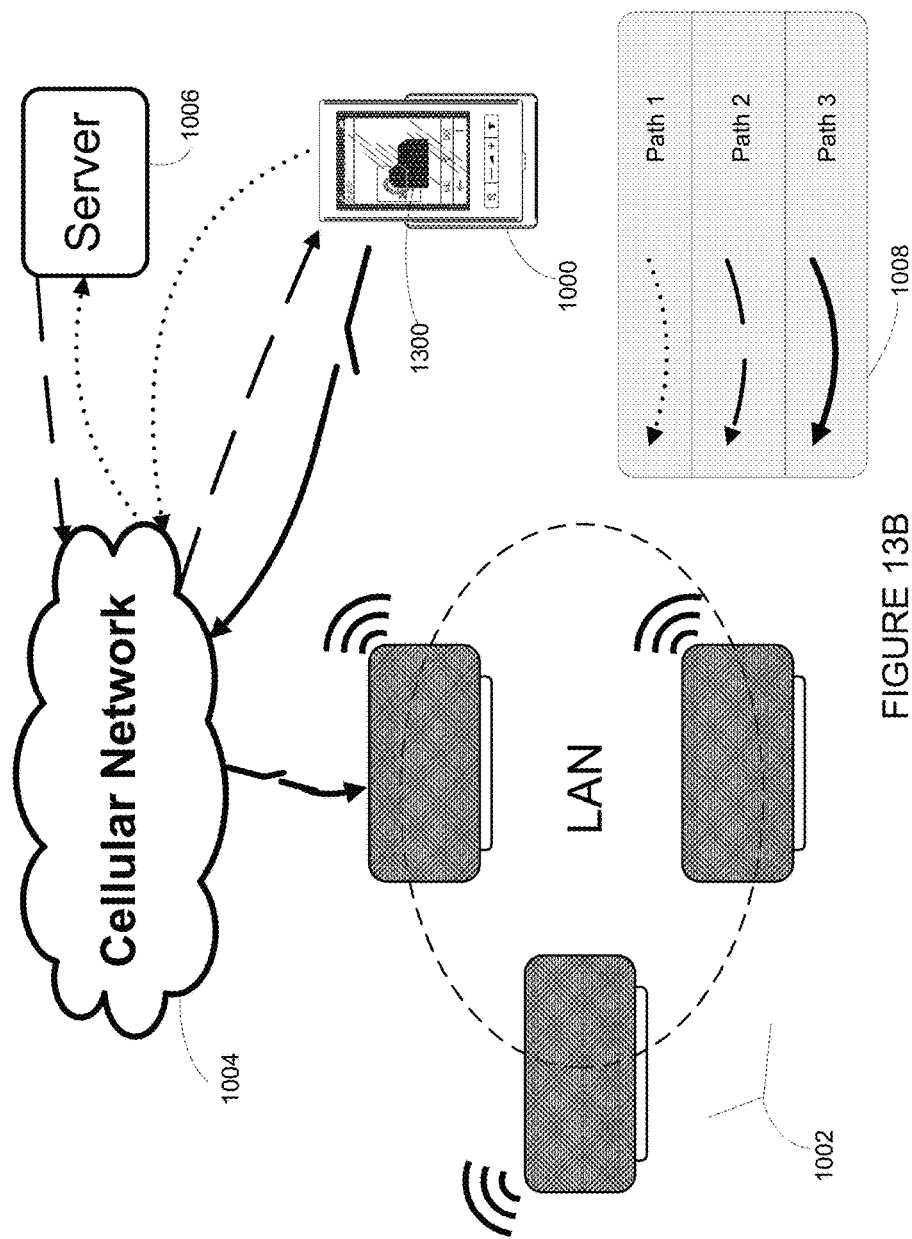
FIG. 13B illustrates an example maintenance of a downloaded control application on a mobile device after the mobile device has disconnected from the media playback system.

As shown in FIG. 13B, the downloaded control application 1300 may be maintained on the mobile device 1000 after the mobile device 1000 is disconnected from the media playback system 1002. This separation is also shown by "broken" Path 3 in FIG. 13B. The control application 1300 may then be used in the future by the mobile device 1000 to control the media playback system 1002 or other playback devices by SONOS®, such any SONOS® devices acquired by the user after experiencing the media playback system 1002.

Figure 14A:
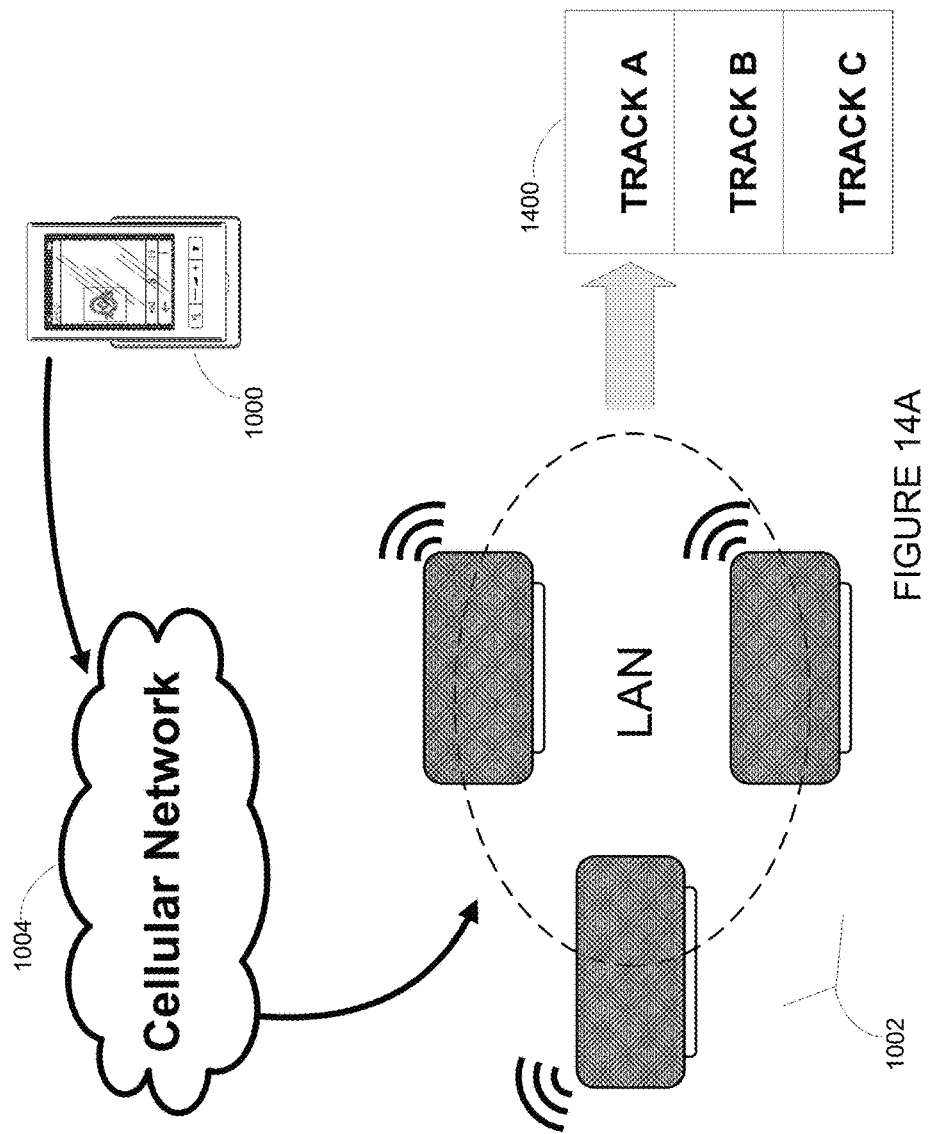
FIG. 14A illustrates an example of a playlist being generated.
Figure 14B:
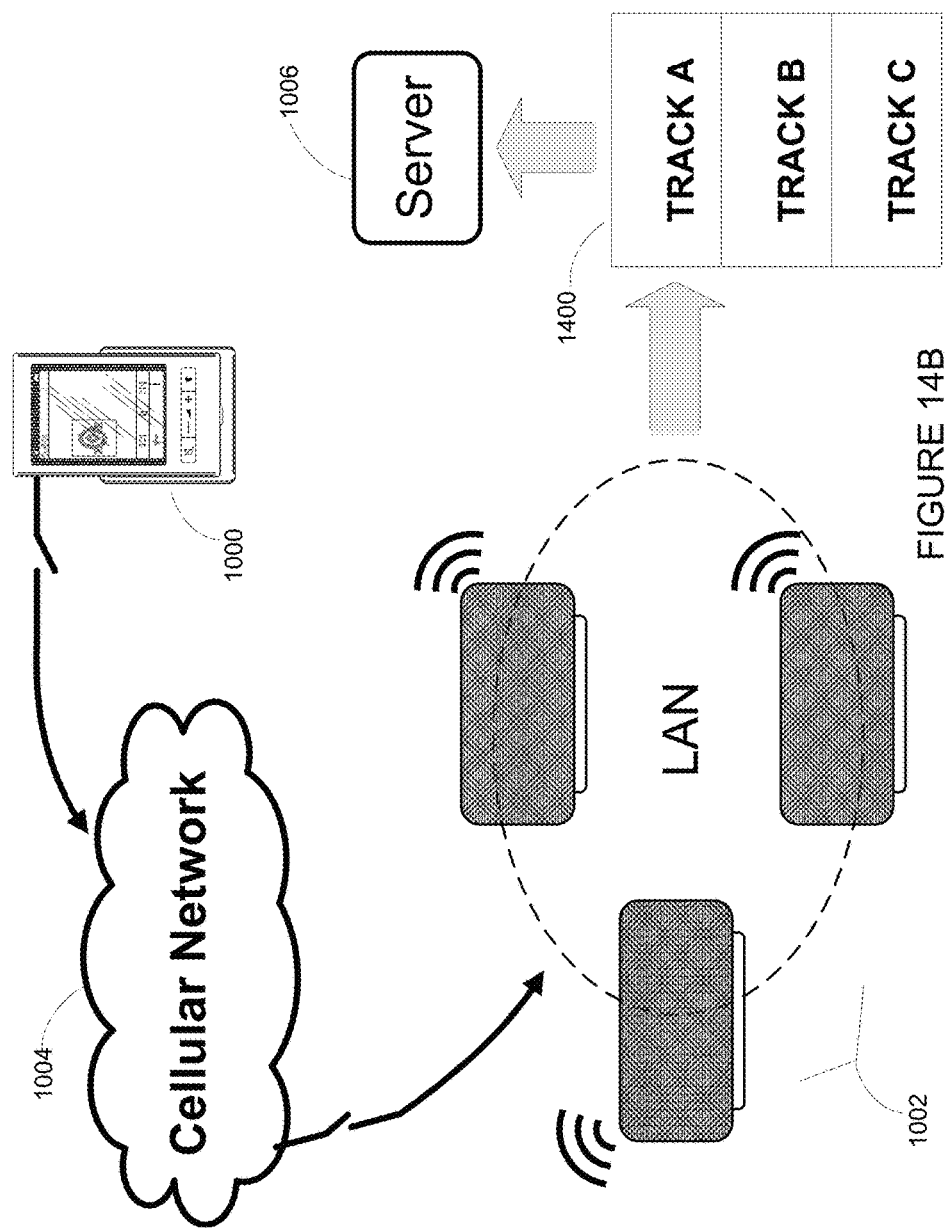
FIG. 14B illustrates an example storing of a playlist on a server.
Figure 14C:
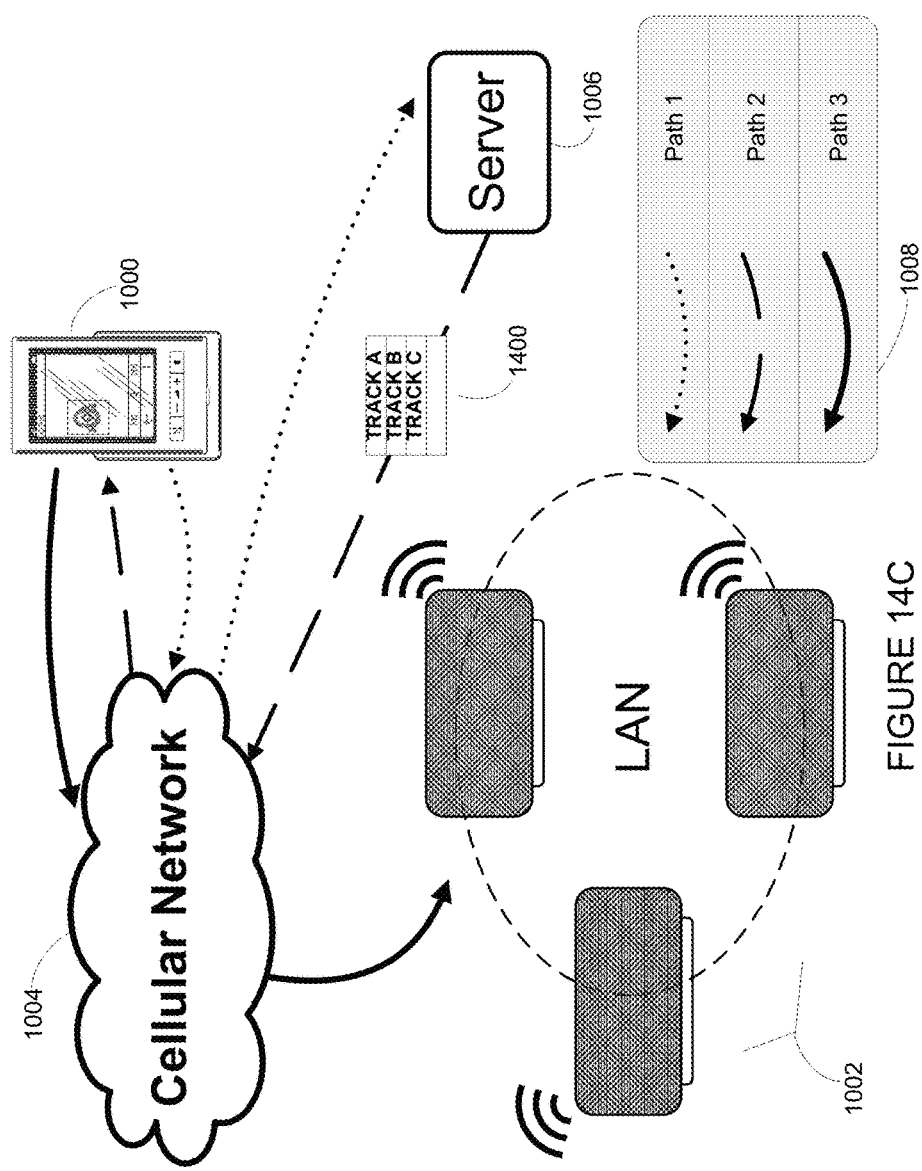
FIG. 14C illustrates an example of a mobile device receiving a playlist that was stored on a server.

A single user 1104 of a mobile device 1000 may control the media playback system 1002 via the cellular network 1004. However, there may also be multiple users with respective mobile devices, such as the mobile device 1000 within the topological range of the media playback system 1002 at the same time, and one or more of the respective mobile devices may have joined the media playback system 1002 via the cellular network as described above. As such, one or more of the respective mobile devices, including the mobile device 1000 may be configured to control the media playback system 1002 as best described above in association with FIG. 8. While controlling the system, the one or more mobile devices may send one or more audio tracks to a playback queue of the media playback system 1002 such as described above in association with FIG. 6. As shown in FIG. 14A, a playlist 1400 may be generated and may include the one or more audio tracks. Playlist 1400 may be one or more of the playlists discussed above in association with FIG. 6. The playlist 1400 may then be stored the remote server 1006, as shown in FIG. 14B. Further, as shown in FIG. 14C, the playlist 1400 may then be retrieved by the mobile device 1000 via Path 2 at any point in time when a mobile device 1000 has joined the media playback system 1002. Other examples are also possible.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As indicated above, the present application involves providing a simple and secure way to allow a user using a mobile device to control a media playback system without having direct access to the secure local network that the media playback system is using. In one aspect, a method is provided. The method involves receiving, by a mobile device, a system identifier of a media playback system, wherein the media playback system is in communication with a remote server, and wherein the media playback system comprises one or more playback devices in communication over a secure local network. Responsive to receiving the system identifier, sending, by the mobile device to the remote server via a cellular network, a request to join the media playback system, the request including the system identifier of the media playback system. The method also involves receiving configuration information of the media playback system from the remote server, the configuration information including information to join the media playback system. The method further involves joining the mobile device to the media playback system via a cellular network and responsively sending from the mobile device to the media playback system via a cellular network one or more commands to control the media playback system.

In another aspect, a non-transitory computer readable memory is provided. The non-transitory computer readable memory has stored thereon instructions executable by a computing device to cause the computing device to perform functions. The functions include receiving, by the mobile device, a system identifier of a media playback system, wherein the media playback system is in communication with a remote server, and wherein the media playback system comprises one or more playback devices in communication over a secure local network. Responsive to receiving the system identifier, sending, by the mobile device to the remote server via a cellular network, a request to join the media playback system, the request including the system identifier of the media playback system. The functions also include receiving configuration information of the media playback system from the remote server, the configuration information including information to join the media playback system. The functions further include joining the mobile device to the media playback system via a cellular network and sending from the mobile device to the media playback system via a cellular network one or more commands to control the media playback system.

In yet another aspect, a system is provided. The device includes a media playback system comprising one or more playback devices in communication over a secure local network, a remote server in communication with the media playback system, a cellular network, and a mobile device. The mobile device is configured to receive a system identifier of the media playback system. Responsive to receiving a system identifier, send to the remote server via the cellular network, a request to join the media playback system, the request including the system identifier of the media playback system. The mobile device is also configured to receive configuration information of the media playback system from the remote server, the configuration information including information to join the media playback system. The mobile device is further configured to join the media playback system via the cellular network and send to the media playback system via the cellular network one or more commands to control the media playback system.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

I claim:

1. A non-transitory computer readable medium having stored therein instructions executable by a mobile device to cause the mobile device to perform a method comprising:
    sending, via a network interface of the mobile device to one or more intermediary servers, data representing a request to join a particular media playback system as a control device of the particular media playback system, wherein the particular media playback system comprises one or more playback devices that are (i) connected to a secure wireless local area network and (ii) controllable by mobile devices that are joined to the particular media playback system as control devices;

receiving, via the network interface from the one or more intermediary servers in response to the request to join the particular media playback system, data representing a configuration of the particular media playback system;

based on the data representing the configuration of the particular media playback system, configuring a control application installed on the mobile device to control the particular media playback system over one or more communication paths via a cellular network and the one or more intermediary servers such that the mobile device is joined to the particular media playback system as a control device, wherein the mobile device is disconnected from the secure wireless local area network;

while the mobile device is joined to the particular media playback system as a control device such that the one or more playback devices are controllable by the control application installed on the mobile device, receiving, via the control application displayed on a touch-screen graphical display of the mobile device, user input to play back audio content on a given playback device of the particular media playback system;

in response to the user input, transmitting, via a network interface of the mobile device over the one or more communication paths via the cellular network and the one or more intermediary servers, one or more commands to play back the audio content on at least one of the one or more playback devices;

while the mobile device remains joined to the particular media playback system as a control device, detecting that the mobile device is outside of a threshold proximity to the particular media playback system; and in response to detecting that the mobile device is outside of the threshold proximity to the particular media playback system, transmitting an instruction to the one or more intermediary servers, while the mobile device remains joined to the particular media playback system and the cellular network, to cause the mobile device to disconnect from the particular media playback system as a control device while remaining connected to the cellular network and disconnected from the secure wireless local area network, wherein disconnection of the mobile device as the control device from the particular media playback system causes the particular media playback system to cease being controllable by the control application installed on the mobile device.

2. The non-transitory computer readable medium of claim 1, wherein detecting that the mobile device is outside of the threshold proximity to the particular media playback system comprises detecting disconnection of the mobile device from the secure wireless local area network that interconnects the mobile device and the one or more playback devices while the mobile device is joined to the particular media playback system.

3. The non-transitory computer readable medium of claim 1, wherein detecting that the mobile device is outside of the threshold proximity to the particular media playback system comprises detecting that the mobile device is outside of physical proximity to the one or more playback devices.

4. The non-transitory computer readable medium of claim 1, wherein the method further comprises:

after disconnecting from the particular media playback system, detecting that the mobile device is within the threshold proximity to the particular media playback system; and based on detecting that the mobile device is within the threshold proximity to the particular media playback system, re-joining the particular media playback system such that the one or more playback devices are controllable by the control application installed on the mobile device.

5. The non-transitory computer readable medium of claim 1, wherein the one or more communication paths via the cellular network from the mobile device to the particular media playback system are one or more first communication paths, and wherein transmitting the one or more commands to play back the audio content on the given playback device comprises:

sending, via one or more second communication paths within a local area network, one or more commands to control the at least one of the one or more playback devices in playing back audio content.

6. The non-transitory computer readable medium of claim 1, wherein the one or more communication paths via the cellular network from the mobile device to the particular media playback system are one or more first communication paths, and wherein the method further comprises:

receiving, via one or more second communication paths within a local area network, data indicating one or more media items in a queue that is playable by the at least one of the one or more playback devices; and causing the touch-screen graphical display to display an indication of the queue within the control application installed on the mobile device.

7. The non-transitory computer readable medium of claim 1, wherein joining the particular media playback system over one or more communication paths via the cellular network from the mobile device to the particular media playback system comprises:

determining that the mobile device is unable to access the particular media playback system via the secure wireless local area network;

sending, to a remote server via the cellular network, a request to join the particular media playback system via the cellular network;

receiving, via the remote server, configuration information that comprises network information to join the secure wireless local area network; and joining the particular media playback system via the secure wireless local area network using the network information.

8. A mobile device comprising:

one or more processors; and tangible, non-transitory, computer-readable media having instructions encoded therein, wherein the instructions, when executed by the one or more processors, cause the mobile device to perform a method comprising:

sending, via a network interface of the mobile device to one or more intermediary servers, data representing a request to join a particular media playback system as a control device of the particular media playback system, wherein the particular media playback system comprises one or more playback devices that are (i) connected to a secure wireless local area network and (ii) controllable by mobile devices that are joined to the particular media playback system as control devices;

receiving, via the network interface from the one or more intermediary servers in response to the request to join the particular media playback system, data representing a configuration of the particular media playback system;

based on the data representing the configuration of the particular media playback system, configuring a control application installed on the mobile device to control the particular media playback system over one or more communication paths via a cellular network and the one or more intermediary servers such that the mobile device is joined to the particular media playback system as a control device, wherein the mobile device is disconnected from the secure wireless local area network;

while the mobile device is joined to the particular media playback system as a control device such that the one or more playback devices are controllable by the control application installed on the mobile device, receiving, via the control application displayed on a touch-screen graphical display of the mobile device, user input to play back audio content on a given playback device of the particular media playback system;

in response to the user input, transmitting, via a network interface of the mobile device over the one or more communication paths via the cellular network and the one or more intermediary servers, one or more commands to play back the audio content on at least one of the one or more playback devices;

while the mobile device remains joined to the particular media playback system as a control device, detecting that the mobile device is outside of a threshold proximity to the particular media playback system; and in response to detecting that the mobile device is outside of the threshold proximity to the particular media playback system, transmitting an instruction to the one or more intermediary servers, while the mobile device remains joined to the particular media playback system and the cellular network, to cause the mobile device to disconnect from the particular media playback system as a control device while remaining connected to the cellular network and disconnected from the secure wireless local area network, wherein disconnection of the mobile device as the control device from the particular media playback system causes the particular media playback system to cease being controllable by the control application installed on the mobile device.

9. The mobile device of claim 8, wherein detecting that the mobile device is outside of the threshold proximity to the particular media playback system comprises detecting disconnection of the mobile device from the secure wireless local area network that interconnects the mobile device and the one or more playback devices while the mobile device is joined to the particular media playback system.

10. The mobile device of claim 8, wherein detecting that the mobile device is outside of the threshold proximity to the particular media playback system comprises detecting that the mobile device is outside of physical proximity to the one or more playback devices.

11. The mobile device of claim 8, wherein the method further comprises:

after disconnecting from the particular media playback system, detecting that the mobile device is within the threshold proximity to the particular media playback system; and based on detecting that the mobile device is within the threshold proximity to the particular media playback system, re-joining the particular media playback system such that the one or more playback devices are controllable by the control application installed on the mobile device.

12. The mobile device of claim 8, wherein the one or more communication paths via the cellular network from the mobile device to the particular media playback system are one or more first communication paths, and wherein transmitting the one or more commands to play back the audio content on the given playback device comprises:

sending, via one or more second communication paths within a local area network, one or more commands to control the at least one of the one or more playback devices in playing back audio content.

13. The mobile device of claim 8, wherein the one or more communication paths via the cellular network from the mobile device to the particular media playback system are one or more first communication paths, and wherein the method further comprises:

receiving, via one or more second communication paths within a local area network, data indicating one or more media items in a queue that is playable by the at least one of the one or more playback devices; and causing the touch-screen graphical display to display an indication of the queue within the control application installed on the mobile device.

14. A method to be performed by a mobile device, the method comprising:

sending, via a network interface of the mobile device to one or more intermediary servers, data representing a request to join a particular media playback system as a control device of the particular media playback system, wherein the particular media playback system comprises one or more playback devices that are (i) connected to a secure wireless local area network and (ii) controllable by mobile devices that are joined to the particular media playback system as control devices;

receiving, via the network interface from the one or more intermediary servers in response to the request to join the particular media playback system, data representing a configuration of the particular media playback system;

based on the data representing the configuration of the particular media playback system, configuring a control application installed on the mobile device to control the particular media playback system over one or more communication paths via a cellular network and the one or more intermediary servers such that the mobile device is joined to the particular media playback system as a control device, wherein the mobile device is disconnected from the secure wireless local area network;

while the mobile device is joined to the particular media playback system as a control device such that the one or more playback devices are controllable by the control application installed on the mobile device, receiving, via the control application displayed on a touch-screen graphical display of the mobile device, user input to play back audio content on a given playback device of the particular media playback system;

in response to the user input, transmitting, via a network interface of the mobile device over the one or more communication paths via the cellular network and the one or more intermediary servers, one or more commands to play back the audio content on at least one of the one or more playback devices;

while the mobile device remains joined to the particular media playback system as a control device, detecting that the mobile device is outside of a threshold proximity to the particular media playback system; and in response to detecting that the mobile device is outside of the threshold proximity to the particular media playback system, transmitting an instruction to the one or more intermediary servers, while the mobile device remains joined to the particular media playback system and the cellular network, to cause the mobile device to disconnect from the particular media playback system as a control device while remaining connected to the cellular network and disconnected from the secure wireless local area network, wherein disconnection of the mobile device as the control device from the particular media playback system causes the particular media playback system to cease being controllable by the control application installed on the mobile device.

15. The method of claim 14, wherein detecting that the mobile device is outside of the threshold proximity to the particular media playback system comprises detecting disconnection of the mobile device from the secure wireless local area network that interconnects the mobile device and the one or more playback devices while the mobile device is joined to the particular media playback system.

16. The method of claim 14, wherein detecting that the mobile device is outside of the threshold proximity to the particular media playback system comprises detecting that the mobile device is outside of physical proximity to the one or more playback devices.

17. The method of claim 14, wherein the method further comprises:

after disconnecting from the particular media playback system, detecting that the mobile device is within the threshold proximity to the particular media playback system; and based on detecting that the mobile device is within the threshold proximity to the particular media playback system, re-joining the particular media playback system such that the one or more playback devices are controllable by a control application installed on the mobile device.

18. The method of claim 14, wherein the one or more communication paths via the cellular network from the mobile device to the particular media playback system are one or more first communication paths, and wherein transmitting the one or more commands to play back the audio content on the given playback device comprises:

sending, via one or more second communication paths within a local area network, one or more commands to control the at least one of the one or more playback devices in playing back audio content.

19. The method of claim 14, wherein the one or more communication paths via the cellular network from the mobile device to the particular media playback system are one or more first communication paths, and wherein the method further comprises:

receiving, via one or more second communication paths within a local area network, data indicating one or more media items in a queue that is playable by the at least one of the one or more playback devices; and causing the touch-screen graphical display to display an indication of the queue within the control application installed on the mobile device.

20. The method of claim 14, wherein joining the particular media playback system over one or more communication paths via the cellular network from the mobile device to the particular media playback system comprises:

determining that the mobile device is unable to access the particular media playback system via the secure wireless local area network;

sending, to a remote server via the cellular network, a request to join the particular media playback system via the cellular network;

receiving, via the remote server, configuration information that comprises network information to join the secure wireless local area network; and joining the particular media playback system via the secure wireless local area network using the network information.

* * * * *